(12) United States Patent
Abbey (10) Patent No.: US 7,284,110 B2
(45) Date of Patent: Oct. 16, 2007

(54) CONFIGURATION SIZE DETERMINATION IN LOGICALLY PARTITIONED ENVIRONMENT

(75) Inventor: Christopher Patrick Abbey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/424,388

(22) Filed: Jun. 15, 2006

(65) Prior Publication Data

US 2006/0224856 A1    Oct. 5, 2006

Related U.S. Application Data

(63) Continuation of application No. 10/418,349, filed on Apr. 17, 2003, now Pat. No. 7,133,994.

(51) Int. Cl.
*G05F 12/00*  (2006.01)

(52) U.S. Cl. .................. 711/173; 711/170; 711/172; 713/1; 713/100

(58) Field of Classification Search ............... None
See application file for complete search history.

(56) References Cited

U.S. PATENT DOCUMENTS

| | | | |
|---|---|---|---|
| 6,546,457 B1 * | 4/2003 | Don et al. | 711/114 |
| 6,594,749 B1 * | 7/2003 | Czajkowski | 711/170 |
| 2002/0129127 A1 * | 9/2002 | Romero et al. | 709/220 |

* cited by examiner

*Primary Examiner*—Jasmine Song
(74) *Attorney, Agent, or Firm*—Patterson & Sheridan, LLP (57) ABSTRACT

Method, apparatus and article of manufacture for determining memory requirements for a partition manager based on a given configuration. In one embodiment, a quantity of memory required for each of a plurality of components is determined, where each component is a collection of function-related code portions. Then, a total quantity of memory required for the partition manager based on the quantities of memory required for the plurality of components is determined.

1 Claim, 5 Drawing Sheets

CONFIGURATION SIZE DETERMINATION IN LOGICALLY PARTITIONED ENVIRONMENT

CROSS-REFERENCE TO RELATED APPLICATIONS

This application is a continuation of U.S. patent application Ser. No. 10/418,349, filed Apr. 17, 2003, now U.S. Pat. No. 7,133,994 which is herein incorporated in its entirety by reference.

BACKGROUND OF THE INVENTION

1. Field of the Invention

The present invention generally relates to data processing and more particularly to memory management in a logically partitioned environment.

2. Description of the Related Art

Logical partitioning refers to the ability to make a system run as if it were two or more independent systems. Each logical partition represents a division of resources in the system and operates as an independent logical system. Each partition is logical because the division of resources may be physical or virtual. An example of logical partitions is the partitioning of a multiprocessor computer system into multiple independent servers, each with its own processors, main storage and I/O devices. One of multiple different operating systems, such as AIX®, LINUX and others can be running in each partition. AIX® is a registered trademark of International Business Machines, Inc.

Logically partitioned systems include a software component referred to as a partition manager. The partition manager is responsible for managing the various logical partitions on the system. In order to perform its responsibilities, the partition manager must have sufficient memory available. In addition, some form of a preemptive memory management technique is needed to avoid arriving at some unknown point in an activation path before discovering that insufficient memory is allocated to the partition manager. Such a condition would require extensive ability to "undo" a partially accepted configuration change throughout the partition manager. Implementing such ability would involve central tracking of which components had already been initialized and which had not, as well as interfaces in all the components to deal with undoing the partially committed change a user has requested. In addition, the likelihood of a memory allocation failing during the activation path increases, which may expose a coding bug for not handling the failure.

One possibility to ensure sufficient memory is to "pre-allocate" memory. However, pre-allocation presents numerous challenges and undesirable consequences. In particular, pre-allocation would require extensive cross component interfaces between configuration management and every other component in the partition manager which allocates storage. New interfaces would also be necessitated between numerous other components to pipe pre-allocation messages around. In essence, the entire allocation code paths would have to be triplicated: pre-allocate, rollback-pre-allocated, and commit-pre-allocated. The pre-allocate code path allocates space for a given configuration change, but does not allow the system to act as if the change has been accepted. The rollback-pre-allocated code path returns the pre-allocated space to the system because the change is being discarded (most likely because of some component's failure to pre-allocate due to insufficient storage). The commit-pre-allocated code path accepts the change that caused the pre-allocate. In addition, all components which allocate memory would have to track the state of their allocations (i.e., non-allocated, pre-allocated and allocated), and participate in some form of multiphase commitment control, such as the above three phases. These changes would add considerable amounts of code to the partition manager, in addition to nontrivial code complexity to every component that allocates memory, as well as requiring additional space, since components would need to allocate structures in order to track the pre-allocation and allocation state of their allocations.

Therefore, there is a need for a system and method for managing memory in a partitioned environment.

SUMMARY OF THE INVENTION

The present invention generally pertains to determining memory requirements for a partition manager based on a given configuration.

One aspect provides a method for determining a memory requirement for a partition manager in a logically partitioned environment of a computer. The partition manager may be configured to at least manager logical partitions present on the computer, and each logical partition may have a separate operating system. A quantity of memory required for each of a plurality of components is determined, where each component is a collection of function-related code portions. Then, a total quantity of memory required for the partition manager based on the quantities of memory required for the plurality of components is determined.

Another aspect of a method for determining a memory requirement for a partition manager in a logically partitioned environment of a computer includes providing a size report for each of a plurality of components, where each component is a collection of function-related code portions and where each size report of a given component specifies a quantity of memory required for the given component; and determining a total quantity of memory required for the partition manager based on at least (i) the size reports; and (ii) a particular configuration of the computer. The partition manager may be configured to at least manager logical partitions present on the computer, and each logical partition may have a separate operating system.

Yet another aspect provides a computer having a plurality of resources including memory and at least one processor; a logical partition manager configured to at least manage one or more logical partitions present on the computer; a size calculator and a configuration manager. The size calculator is configured to determine an amount of the memory needed by the logical partition manager at initial program load (i.e., boot time) for a particular configuration and prior to accepting configuration requests from users. The configuration manager is configured to at least determine whether the amount of memory needed by the logical partition manager is available for a particular configuration; and if so, accept the particular configuration.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally pertains to memory management in a logically partitioned environment. Predictive calculations are made to determine in advance the amount of memory required by a partition manager. The calculated amount of memory is then reserved for the exclusive use of the partition manager, thereby preventing logical partitions from being configured into the reserve memory. Another aspect of the invention provides for rejecting additional configuration requests that exceed the capabilities of the partition manager's current memory allocation.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
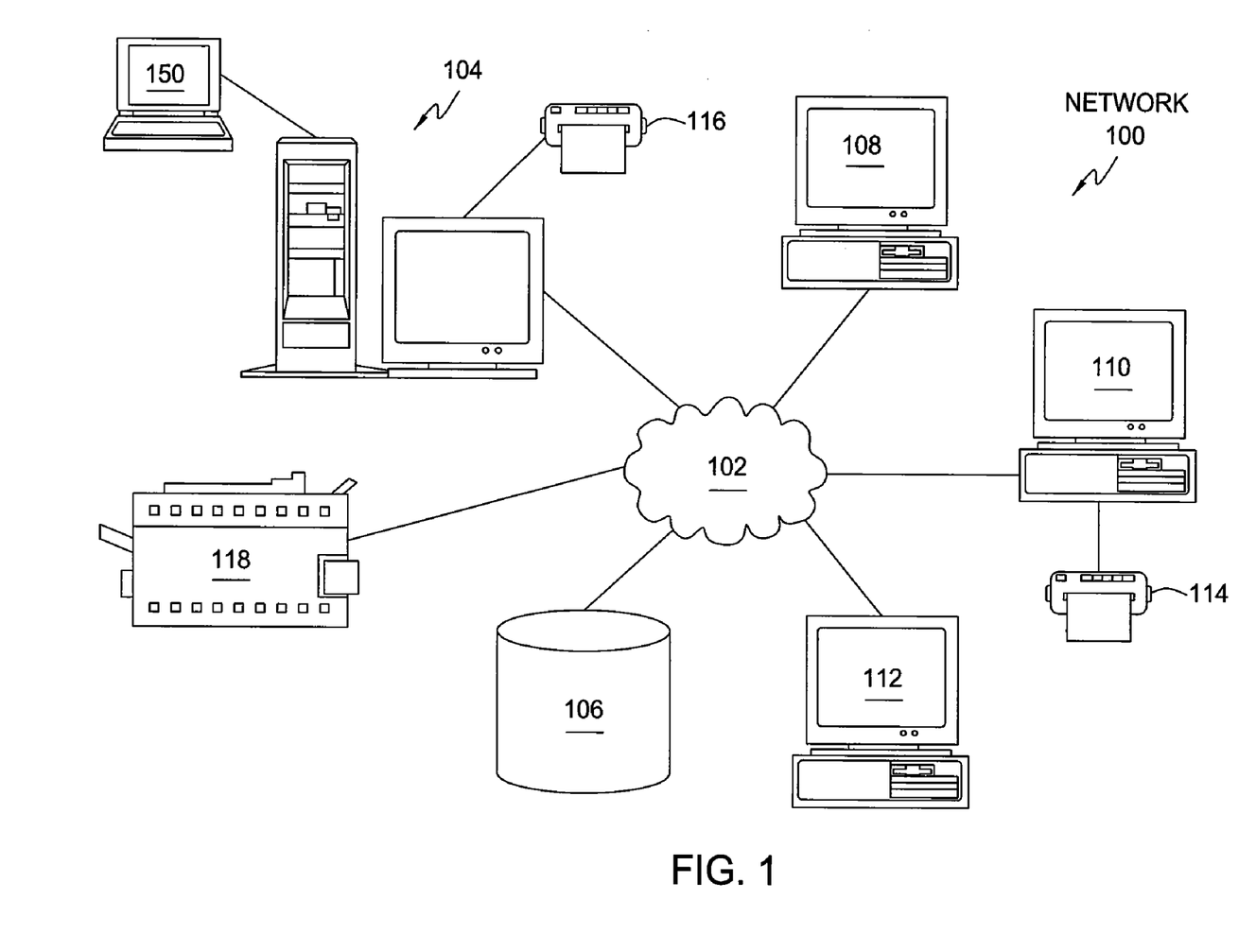
FIG. 1 is a block diagram of a network of computers, including a logically partitioned computer.

Referring now to FIG. 1, a distributed data processing system 100 is shown. The distributed data processing system 100 is a network of computers in which the present invention may be implemented. The distributed data processing system 100 includes a network 102, which is the medium used to provide communications links between various devices and computers connected within the distributed data processing system 100. The network 102 may include permanent connections, such as wire or fiber optic cables, or temporary connections made through telephone connections. In a particular example, the distributed data processing system 100 is the Internet, with the network 102 representing a worldwide collection of networks and gateways that use the TCP/IP suite of protocols to communicate with one another. The distributed data processing system 100 also may be implemented as a number of different types of networks such as, for example, an intranet or a local area network.

In the depicted example, a data processing system 104 configured as a server is connected to the network 102, along with a storage unit 106. A plurality of clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, the server 104 is a logically partitioned platform and provides data, such as boot files, operating system images and applications, to the clients 108-112.

The server 104 is connected to a hardware management console 150. The hardware system console 150 may be a laptop computer and is used to display messages to an operator from each operating system image running on the server 104, as well as to send input information received from the operator, to the server 104.

The distributed data processing system 100 also includes devices such as printers 114, 116 and 118. A client, such as client 110, may print directly to the printer 114. In contrast, clients, such as the clients 108 and 112, do not have directly attached printers. These clients may print to printer 116, which is attached to the server 104, or to the printer 118, which is a network printer that does not require connection to a computer for printing documents. The client 110, alternatively, may print to the printer 116 or the printer 118, depending on the printer type and the document requirements. Of course, the distributed data processing system 100 may include additional servers, clients, and other devices not shown.

It is noted that the distributed system 100 shown in FIG. 1 is merely representative and the other embodiments or contemplated. For example, although the server 104 is shown as a component of a distributed system, the invention may also be practiced in a standalone system.

It is noted that the network 100 shown in FIG. 1 is merely representative and the other embodiments or contemplated. For example, although the data processing system 104 is shown as a component of a distributed system, the invention may also be practiced in a standalone system.

Figure 2:
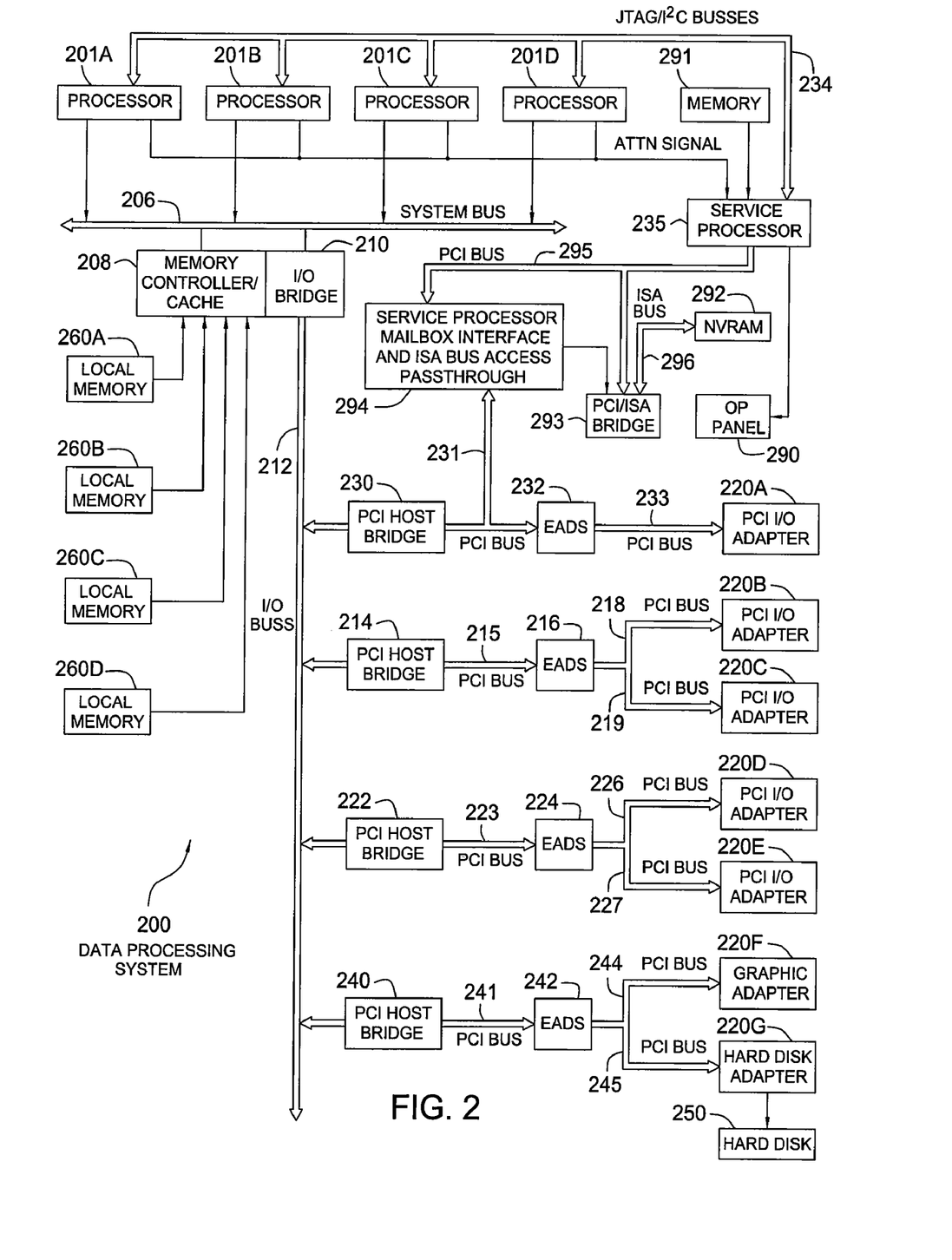
FIG. 2 is a block diagram of a computer illustrating hardware resources, some of which may be partitioned.

Referring now to FIG. 2, an illustrative representation of the data processing system 104 is shown which depicts various resources that may be allocated between various logical partitions. Illustratively, data processing system 104 is a symmetric multiprocessor (SMP) system including a plurality of processors 201A-D connected to system bus 206. In a particular embodiment, data processing system 104 may be an eServer iSeries computer, a product of International Business Machines Corporation in Armonk, N.Y., implemented as a server within a network. Although shown as a SMP system, a single processor system may alternatively be employed. Also connected to system bus 206 is memory controller/cache 208, which provides an interface to a plurality of local memories 260A-D. I/O bus bridge 210 is connected to system bus 206 and provides an interface to I/O bus 212. Memory controller/cache 208 and I/O bus bridge 210 may be integrated as depicted.

The data processing system is a Peripheral component interconnect (PCI) bus implementation which supports a plurality of Input/Output adapters. Typical PCI bus implementations will support between four and eight I/O adapters (i.e. expansion slots for add-in connectors). Illustratively, the processing system 104 includes seven (7) I/O adapters 220A-G. Each I/O Adapter 220A-G provides an interface between data processing system 104 and input/output devices such as, for example, other network computers, which are clients to data processing system 104. By way of example, a PCI Host bridge 214 connected to I/O bus 212 provides an interface to PCI local bus 215. A number (two shown) of I/O adapters 220B-C may be connected to PCI bus 215 via EADS 216 and respective PCI buses 218 and 219. Other I/O adapters may be similarly connected by respective PCI host bridges (e.g., bridges 222, 230 and 240), EADS (e.g., EADS 224, 232, and 242) and PCI buses (e.g., 223, 226-227, 231, 233, 241 and 244-245).

As examples of particular types of adapters, the system 104 includes a memory mapped graphics adapter 220F, which may be connected to I/O bus 212 through the PCI Host Bridge 240 and EADS 242 via PCI buses 241 and 244 as depicted. Also, a hard disk 250 may be connected to I/O bus 212 through PCI Host Bridge 240 and EADS 242 via PCI buses 241 and 245, and a hard disk adaptor 220G as depicted.

The PCI host bridge 230 provides an interface for a PCI bus 231 to connect to I/O bus 212. PCI bus 231 connects PCI host bridge 230 to the service processor mailbox interface and ISA bus access passthrough logic 294 and EADS 232. The ISA bus access passthrough logic 294 forwards PCI accesses destined to the PCI/ISA bridge 293, which also connects to NV-RAM storage 292 via an ISA bus 296. A Service processor 235 is coupled to the service processor mailbox interface 294 through its local PCI bus 295. The service processor 235 is also connected to processors 201A-D via a plurality of JTAG/I$^2$C buses 234. JTAG/I$^2$C buses 234 are a combination of JTAG/scan busses (see IEEE 1149.1) and Phillips I$^2$C buses. However, alternatively, JTAG/I$^2$C buses 234 may be replaced by only Phillips I$^2$C busses or only JTAG/scan busses. All SP-ATTN signals of the host processors 201A-D are connected together to an interrupt input signal of the service processor 235. The service processor 235 has its own local memory 291, and has access to the hardware op-panel 290.

When data processing system 104 is initially powered up, service processor 235 uses the JTAG/scan buses 234 to interrogate the system (Host) processors 201A-D, memory controller 208, and I/O bridge 210. At completion of this step, service processor 235 has an inventory and topology understanding of data processing system 104. Service processor 235 also executes Built-In-Self-Tests (BISTs), Basic Assurance Tests (BATs), and memory tests on all elements found by interrogating the system processors 201A-D, memory controller 208 and I/O bridge 210. Any error information for failures detected during the BISTs, BATs and memory tests may be gathered and reported by service processor 235.

If a meaningful/valid configuration of system resources is still possible after taking out the elements found to be faulty during the BISTs, BATs and memory tests, then the data processing system 104 is allowed to proceed to load executable code into local (Host) memories 260A-D. Service processor 235 then releases the Host processors 201A-D for execution of the code loaded into Host memory 260A-D, also according to the determined state. The service processor 235 may also perform monitoring functions, such as checking for, and reporting, errors in the data processing system 104.

It is understood that FIG. 2 is merely one configuration for a data processing system. Embodiments of the invention can apply to any comparable configuration, regardless of whether the system 104 is a complicated multi-user apparatus, a single-user workstation or a network appliance that does not have non-volatile storage of its own. As such, the depicted example is not meant to imply architectural limitations with respect to the present invention and those of ordinary skill in the art will appreciate that the hardware depicted in FIG. 2 may vary. For example, other peripheral devices, such as optical disk drives and the like, also may be used in addition to or in place of the hardware depicted. In addition, the system 104 may be a single processor system instead of a multiprocessor system.

As noted above, the server computer 104 is logically partitioned, whereby where each separate group of resources of a logical partition is under the control of a separate operating system. Thus, the data processing system 104 may have multiple heterogeneous operating systems (or multiple instances of a single operating system) running simultaneously. Each of these multiple operating systems may have any number of software programs executing within in it. When logically partitioned, different hardware resources, such as processors 201A-D, memories 260A-D, and I/O adapters 220A-E may be assigned to different logical partitions.

For example, suppose data processing system 104 is divided into three logical partitions, P1, P2 and P3 where each partition has a different operating system assigned to it. Thus, one instance of the Advanced Interactive Executive (AIX) operating system may be executing within partition P1, a second instance (image) of the AIX operating system may be executing within partition P2 and a LINUX operating system may be operating within logical partition P3.

Each operating system executing within data processing system 104 may access only those I/O units that are within its logical partition. Thus, each of I/O adapters 220A-E, each of the processors 201A-D, each of the local memories 260A-D is assigned to one of the three partitions. For example, processor 201A, memory 260A, and I/O adapters 220B, 220D and 220E may be assigned to logical partition P1; processors 202B-C, memory 260B, and I/O adapters 220C and 220A may be assigned to partition P2; and processor 201 D, memories 262C-D, and I/O adapters 220F-G may be assigned to logical partition P3. Alternatively, the logical partitions may define one or more logical/virtual resources, such as processors. A virtual processor, for example, corresponds to processing capability provided by one or more physical processors. Where virtual processors are implemented, the logical partitions do not have exclusive ownership over specific physical processors. Rather, the physical processors may be shared amongst the various logical partitions, and are available to the logical partitions according to the virtual processors defined for the respective logical partitions.

It should be noted, that even singular resources may be shared. For example, the system 104 may be a single processor system, in which the single processor is a shared resource between multiple logical partitions. In such a hardware environment, each logical partition "owns" a fractional portion of the processor.

Figure 3:
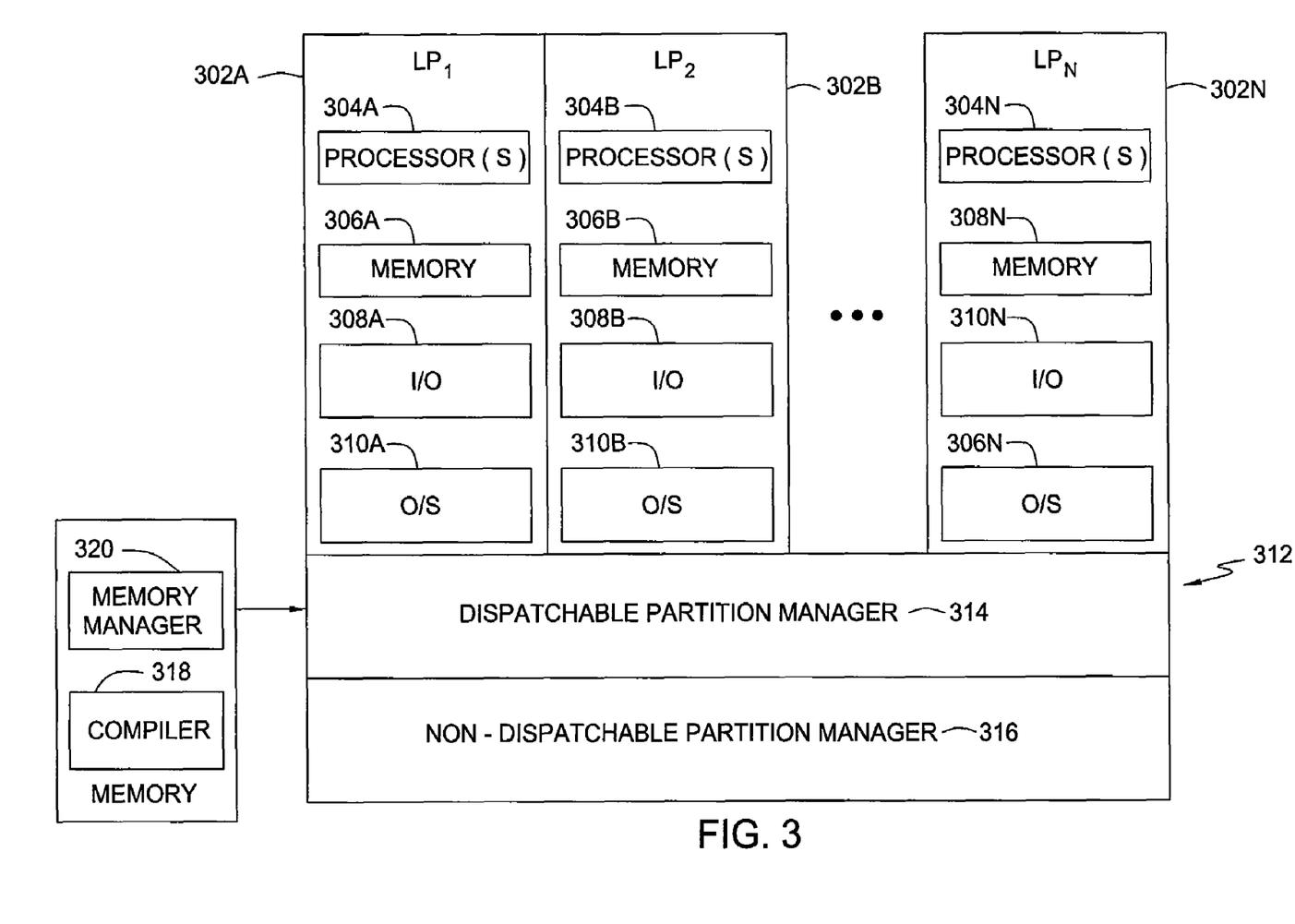
FIG. 3 is a block diagram of a logically partitioned computer.

Referring now to FIG. 3, one representation of a logically partitioned instance of the data processing system 104 is shown. The system 104 includes multiple logical partitions 302A, 302B . . . 302N (collectively, logical partitions 302). The system 104 includes multiple logical partitions 302A, 302B . . . 302N (collectively, logical partitions 302). In a particular embodiment, the system 104 may have up to sixty-two logical partitions 302; however, the particular capacity for logical partitions is not limiting of the invention. The logical partitions are managed by a partition manager 312. Each logical partition 302 has processor(s) 304A, 304B, . . . 304N, memory 306A, 306B, . . . 306N, and I/O devices 308A, 308B, . . . 308N, and may run its own operating system 310A, 310B, . . . 310N independently of the other logical partitions 302. The resources associated with the various partitions 302 may be physical or logical/virtual. A virtual resource represents the capacity of a logical partition to the resource, which capacity is made available by one or more resources not exclusively under the control of the partition. A virtual processor, for example, corresponds to processing capability provided by one or more physical processors. Where virtual processors are implemented, the logical partitions do not have exclusive ownership over specific physical processors. Rather, the physical processors may be shared amongst the various logical partitions, and are available to the logical partitions according to the virtual processors defined for the respective logical partitions.

In one embodiment, logical partitions may be added or dropped from the system 104 dynamically during operation, and the system 104 is therefore referred to as being dynamically partitioned. In another embodiment, the logical partitions may be established at IPL (initial program load) and remain unchanged during operation, in which case the system 104 is referred to as being statically partitioned.

In either case, handling partitioning is the responsibility of a partition manager 312. In a particular embodiment, the partition manager 312 is implemented as a "Hypervisor," a software component available from International Business Machines, Inc. of Armonk, N.Y. In one embodiment, the partition manager 312 may be considered to comprise a dispatchable partition manager 314 and a non-dispatchable partition manager 316. Generally, the non-dispatchable partition manager 316 is generally implemented as system firmware of the computer system 104, provides low-level partition management functions, such as transport control enablement, page-table management and contains the data and access methods needed to configure, service, and run multiple logical partitions 302. The dispatchable partition manager 314 is system firmware that generally handles higher-level partition management functions, such as virtual service processor functions, and starting/stopping partitions.

According to one aspect of the invention, the partition manager 312 is configured to calculate a predicted amount of memory needed to operate. In addition, the partition manager is configured to reject additional configuration requests (e.g., from a user) which exceed the available amount of memory.

Figure 4:
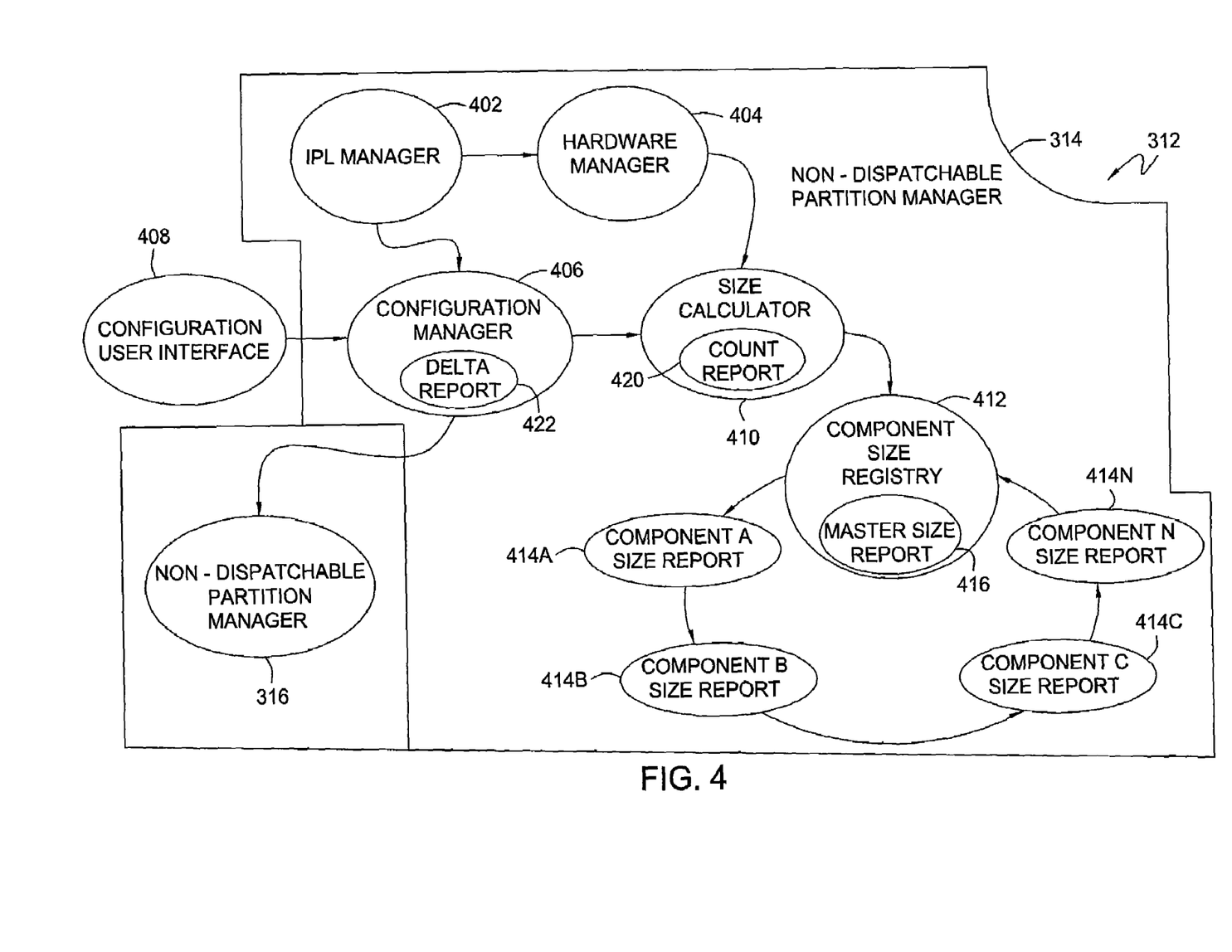
FIG. 4 is a diagram of software components of a logically partitioned system configured to determine memory requirements of a partition manager.

Referring now to FIG. 4, a diagram is shown illustrating one embodiment of the present invention. Generally, FIG. 4 shows the non-dispatchable partition manager 316 and various aspects of the dispatchable partition manager 314. In one embodiment, the various aspects of the dispatchable partition manager 314 are implemented as objects in an object-oriented programming language, such as Java. However, while aspects of the invention may be described in the context of an object-oriented programming (OOP) language, it is understood that the invention is not limited to OOP nor any other particular programming language. References to OOP terms such as objects, classes, subclasses and the like are merely for convenience of explanation.

The dispatchable partition manager 314 generally includes an initial program load (IPL) manager 402, a hardware manager 404, a configuration manager 406, a size calculator 410 and a component size registry 412. At the initial program load, the IPL manager 402 initiates the independent executions of the hardware manager 404 and the configuration manager 406. The hardware manager 404 is responsible for the hardware on the system 104. These responsibilities include ensuring that devices are working properly (e.g., ensuring that the various PCI devices are properly initialized) and that the allocations of hardware to the various logical partitions 302 are appropriate. The configuration manager 406 tracks the various logical partitions 302 and the logical associations between hardware and the logical partitions 302. A significant function of the configuration manager 406 is to call the size calculator 410 to determine how much main memory is required for the given logical partition configuration on the system 104. Once invoked for this purpose by the configuration manager 406, the size calculator 410 may wait for a call from the hardware manager indicating that all hardware resources on the system 104 have been accounted for (i.e., have reported to the hardware manager 404). The size calculator 410 then accesses the component size registry 412 and calculates a summation of the total main memory needed by the partition manager 312. In one embodiment, the component size registry 410 is a collection of individual size reports 414A, 414B, . . . 414N registered by the various components configured for the system 104. In one embodiment, a "component" refers to code related to a common function. For example, one component is all code related to configuration of a logical partition, another component is all the code related to PCI buses, another component is all the code related to global interrupt queues, and so on. As such, some of the entities of the partition manager 312 shown in FIG. 4 are themselves components (such as the IPL manager 402 and hardware manager 404) and, therefore, registers a size report 414 with the component size registry 412.

Each size report 414 provides component-specific size information for various configuration options. In one embodiment, the size reports 414 are implemented using a base class containing a number of fields with default values (i.e., zeros) and a separate set of methods to handle rounding of the requested size to the allocated size. An exemplary base class is shown below in TABLE I and an exemplary rounding method is shown in TABLE II.

TABLE I

| Illustrative Base Class |
|---|
| 001    Class BaseSize { |
| 002        int Base = 0; |
| 003        int PerLpSize = 0; |
| 004        int PerIOSlotSize = 0; |
| 005        . . . |
| 006        . . . |

TABLE II

Illustrative Rounding Method

```
001    int round (int requestsize) {return (((requestsize + granularity−1)
002    /granularity)*granularity) + overhead;}
```

Note that lines 002 through 004 of TABLE I illustrate fields of configuration option types for which main memory is needed by a particular component. Illustratively, the option type fields shown include a "Base" type, a "PerLpSize" type and a "PerIOSlotSize." The "Base" option type corresponds to the memory needed for a component to exist on the system 104. The "PerLpSize" option type corresponds to the memory needed by a component per logical partition. The "PerIOSlotSize" option type corresponds to the memory needed by a component for an IO slot. The option types shown in TABLE1 are merely illustrative and it is understood that the base class may provide for any number of additional or different option types.

Each component then subclasses the base class and provides its component-specific information for those configuration option types needed. As such, a given component may provide values for any number (i.e., one or more) of the available option types provided by the base class. An exemplary representation of a size report for a specific component is shown in TABLE III.

TABLE III

Illustrative Size Report

```
001    Class OurComponentSize    :   public BaseSize {
002         OurComponentSize( )   {
003             Base = methodToRoundUp (sizeof (foo1) ) *
004         numberOfThemWeCreate +
005             methodToRoundUp (sizeof (foo2) *
006         numberOfTheseUsed;
007             PerLpSize = methodToRoundUp (sizeof (foo3));
008         . . .
009     . . .
```

In the example provided by TABLE III, a value for the "Base" option type is provided for a class "foo1." In operation, a compiler 318 (shown in FIG. 3) calculates the amount of memory (e.g., number of bytes) needed by the instantiated object for the class "foo1." In practice, the amount of memory needed may be calculated as a number of bytes, while the memory manager 320 (also shown in FIG. 3) responsible for allocating the memory to "foo1" at runtime may be configured to allocate blocks of memory on a different size scale. Accordingly, the method, "methodToRoundUp," is used to round up the requested memory (i.e., the amount of memory calculated by the compiler 318) to a size consistent with the scale used by the memory manager 320. The same process is performed for each of the other classes of each configuration option type of a given component (e.g., "foo2," "foo3," etc). In this manner, a value (i.e., bytes of memory) is calculated for each configuration option type of a given component, and these values are registered with the component size registry 412 in the form of a size report 414.

To determine the total amount of memory needed by the partition manager 312, the size calculator 410 iterates through each size report 414 registered with the component size registry 412 and sums the values for each configuration option type. The summed values for each configuration type may be stored to a master size report 416. The size calculator 410 then multiplies out the various summations according to the configuration and hardware present. For example, assume that the total sum value for the "PerLpSize" option type in the master size report 416 is 100 bytes, and that 5 partitions are configured for the system 104, where "5" is referred to a configuration multiplier and is specific to the particular configuration. The total memory required for "PerLpSize" option type is the product of 100 and 5 (100*5), or 500 bytes. This calculation is performed for each configuration option type field using the appropriate configuration multiplier for each field. The size calculator 410 then sums the individual per-option-type values, to arrive at the total memory needed for the partition manager 312. This total value is returned to the configuration manager 406. In one embodiment, the configuration multipliers are provided in a separate registered report, referred to a count report 420.

It is contemplated that the individual per-option-type values may be rounded to account for overhead needed to manage the memory space to be allocated. Further, an additional amount of memory may be added to this rounded value as a "safety net" to account for unaccounted/unexpected variations in the input. It is noted that the rounding methods implemented according to the present invention may vary depending on the particular memory management scheme implemented by the memory manager 320. In some environments, a plurality of memory managers may be implemented to handle different allocations (i.e., different granularities of allocation memory blocks). In this case, the report size processing described herein is performed for each memory manager to ensure that the rounding for each memory manager is consistent with the respective block size.

Persons skilled in the art will recognize that the mathematical operations may be performed in different orders. For example, the values of the individual option type fields are multiplied, summed and then provided to the master size report 416. In either case, the values of the fields in the master size report 416 represent the total memory required for a particular configuration option type.

The configuration manager 406 then validates the configuration on the system 104 based on the total value received from the size calculator 410. That is, the configuration manager 406 determines whether sufficient main memory was set aside for the partition manager 312 the last time the persistent configuration was updated. If insufficient memory was set aside, the configuration manager 406 makes the necessary adjustments to the configuration in order to free up the needed memory for the partition manager 312, if possible. If the needed memory cannot be made available then an error occurs, of which a user may be notified via a configuration user interface 418. In one embodiment, the configuration user interface 418 is the hardware management console 150 of FIG. 1. If the needed memory is available, the configuration manager 406 issues a notification via a configuration user interface 418. The configuration manager 406 then signals the partition configuration to the non-dispatchable partition manager 316. In response, the non-dispatchable partition manager 316 partitions the system and sets up the hardware to make it ready for the logical partitions' operating systems to start.

In one embodiment, configuration changes are made during operation (post-IPL). For example, a user may make configuration changes via the configuration user interface 418. Illustrative configuration changes include requests to create a partition, delete a partition, assign a particular IO slot to a particular partition, create a virtual IO adapter, etc. Configuration changes may also be in the form of a batch.

In any case, a request for configuration changes causes the configuration manager 406 to determine a delta value, where the delta value is the change in the number of configuration object types. In one embodiment, the delta values are provided in a report referred to as a delta report 422, in which the delta values are the calculated differences between the count values (per field) of the count report 420 and the new values specified in the request. As an example, a configuration change adding another logical partition results in a "PerLpSize" option type change of positive one (+1), while the removal of a logical partition results in a "PerLpSize" option type change of negative one (−1). The delta value is then provided to the size calculator 410, which uses the delta values as multipliers of the previously initialized fields in the master size report 416. The individual product values of each field are then summed. The resulting value is the additional memory needed by the partition manager 312 as result of the configuration changes. This resulting value is returned to the configuration manager 406. The resulting value may be a positive number (in which case additional memory is needed for the partition manager 312), a negative number (in which case no additional memory is needed, and the memory requirements for future IPLs can be reduced) or zero (in which case no additional memory is needed). If the resulting value is a positive number, the configuration manager 406 determines whether the memory request can be honored. In some instances the partition manager 312 may already have more memory allocated to it than initially required (i.e., as determined during IPL), in which case no additional allocation is needed. If the required memory value is more than the currently allocated memory, then the configuration manager 406 must determine whether additional memory can be allocated. That is, the configuration manager 406 determines whether unallocated memory can be allocated to the partition manager 312. If so, the memory is allocated accordingly and the configuration manager 406 signals the configuration to the non-dispatchable partition manager 316, which then implements the configuration. Otherwise, an error message is returned to a user via the configuration user interface 408; in which case the user may choose to reallocate memory via the configuration user interface 408. If the configuration is altered to an acceptable state, then a user may retry.

Figure 5:
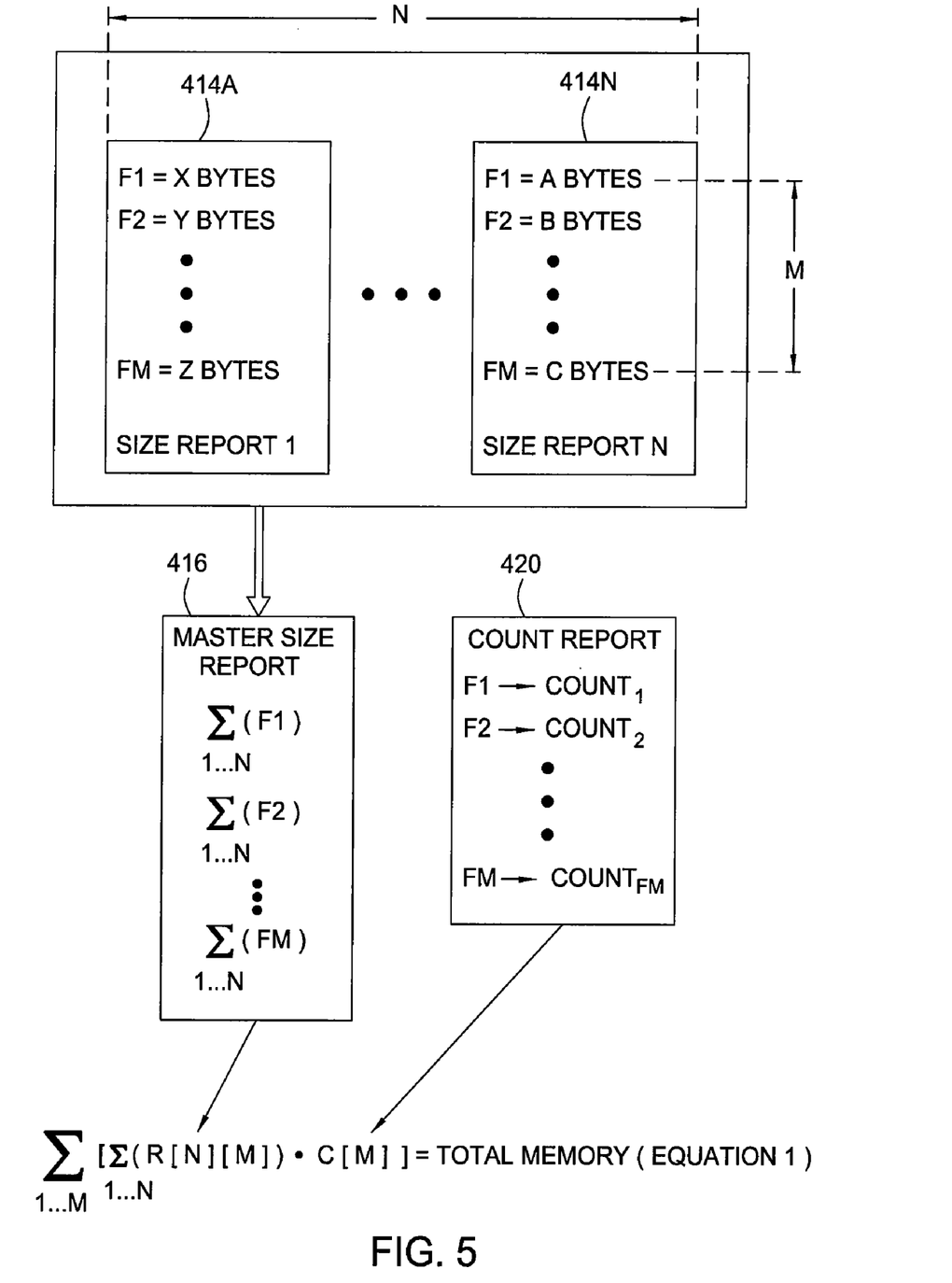
FIG. 5 shows one embodiment for calculating a memory requirement for a partition manager.

A particular example will now be described with reference to FIG. 5. FIG. 5 shows a number, N, of size reports 414. Each size report has a plurality of configuration option fields, F1, F2, . . . F$_M$. The total memory needed for the partition manager is given by the representative Equation. In particular, the values for each of the plurality of configuration option fields are summed for all size reports (N) to arrive at a summation value for each field, which values are maintained in the master size report 416. These summations are represented by the inner sum of the Equation (i.e. the sum of R[N][M] for 1 through M, wherein N is a given report and M is a field in the given report). To calculate the total memory needed for the partition manager, the product of each summation value (in the master size report) and corresponding configuration multiplier ($C_M$) is calculated. As noted above, the configuration multipliers are each specific to a particular configuration option field and may be provided in a count report 420. The sum of the products is the total memory required for the partition manager (Equation 1). Again, depending upon the particular memory management scheme, rounding techniques may be used at different points during the calculation to ensure sufficient memory. Thus, the individual byte values for each field in the size reports may be rounded and the calculated result of Equation 1 may be rounded. Further, the latter value may itself also be rounded.

In one aspect, the registry approach of the present invention allows each of the components to update its respective size reports individually and independently, without requiring manual intervention by any central entity or contention over centrally located table. Instead, the components can simply update their own module that provides the report which is registered, and rebuild the module that contains the report.

While the foregoing is directed to embodiments of the present invention, other and further embodiments of the invention may be devised without departing from the basic scope thereof, and the scope thereof is determined by the claims that follow.

What is claimed is:

1. A method for determining a memory requirement for a partition manager in a logically partitioned environment of a computer, comprising:
   determining a quantity of memory required for each of a plurality of components, where each component is a collection of function-related code portions; and
   determining a total quantity of memory required for the partition manager based on the quantities of memory required for the plurality of components; wherein the logical partition manager is configured to at least manage logical partitions present on the computer, each logical partition having a separate operating system, wherein determining the total quantity of memory comprises:
   summing the quantities of memory required for the plurality of components to arrive at a sum total; and
   multiplying the sum total by a configuration multiplier to arrive the total quantity of memory, wherein the configuration multiplier is specific to a particular configuration of the computer.

* * * * *